INDICATOR FOR COLOR TELEVISION RECEIVERS
Original Filed May 27, 1963
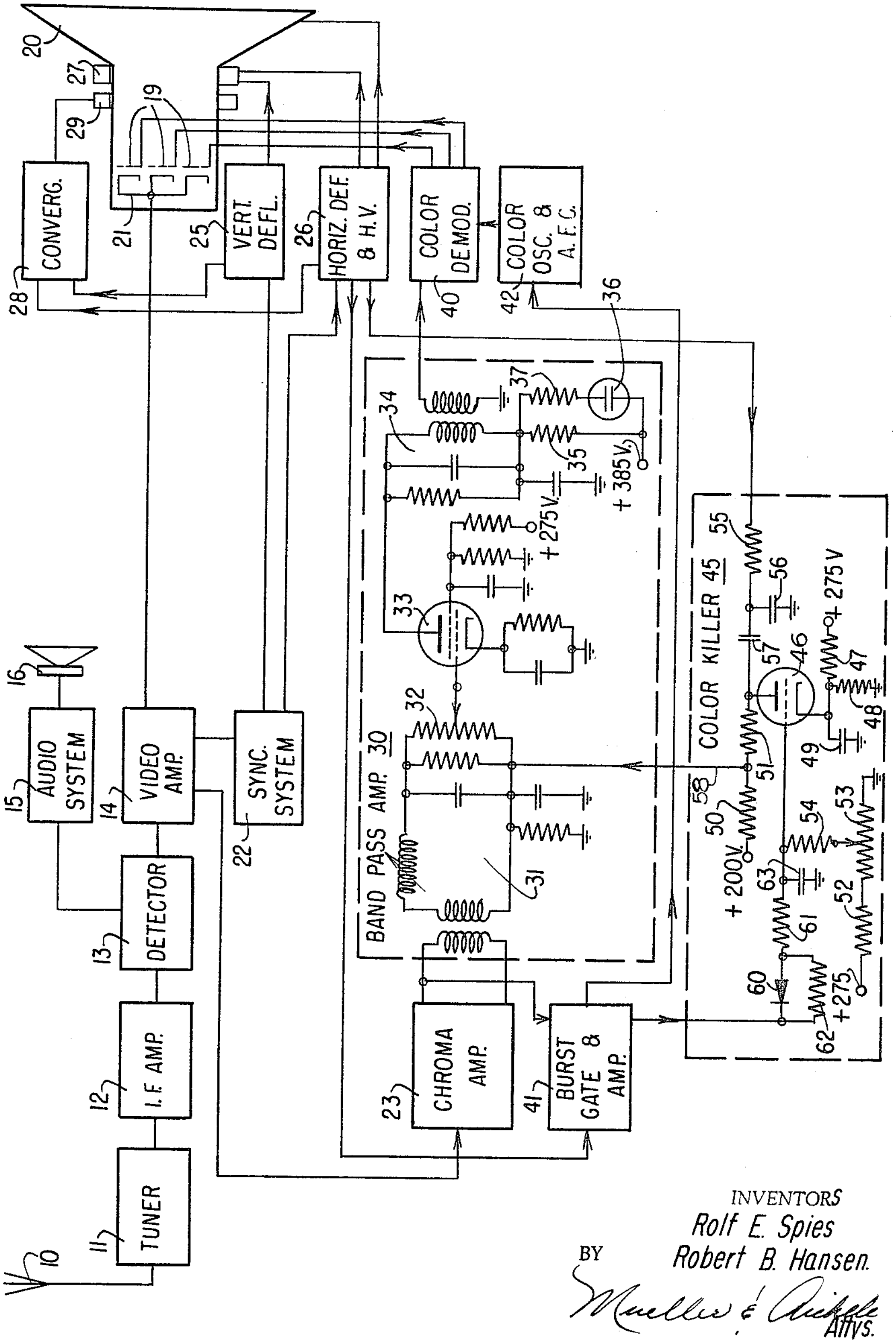
INVENTORS
Rolf E. Spies
Robert B. Hansen
BY
Mueller & Aichele
Attys.

United States Patent Office 3,287,494
Patented Nov. 22, 1966

3,287,494

INDICATOR FOR COLOR TELEVISION RECEIVERS

Rolf E. Spies, Lyons, and Robert B. Hansen, Arlington Heights, Ill., assignors to Motorola, Inc., Chicago, Ill., a corporation of Illinois Continuation of application Ser. No. 283,448, May 27, 1963. This application Feb. 17, 1966, Ser. No. 537,595
8 Claims. (Cl. 178—5.4)

This invention relates generally to color television receivers and more particularly to an indicator for showing that a color signal is being received and that the receiver is tuned to the color signal. This application is a continuation of application Serial No. 283,448, filed May 27, 1963.

Present color television receivers include a tube wherein the cathode ray beam or beams strike phosphors of different colors to thereby reproduce an image having different colors. These receivers are capable of receiving monochrome signals and producing monochrome pictures therefrom, and for automatically receiving color signals, when such signals are on the air, and for producing color pictures therefrom. The color signals include chroma signal components for controlling the reproduction of various colors and a color reference component which is used to derive color signal components from the received composite color signal. The color reference and chroma signal components are present only in a composite color signal and are not included in a monochrome signal.

In order to disable certain parts of the receiver which are needed for color reproduction and not for monochrome reproduction, "color killer" circuits which respond to the color reference component have been used. Such color killer circuits may disable an amplifier circuit which translates the chroma signal components so that interference signals will not be translated thereby in the absence of the chroma components. Inasmuch as reception of the color reference components depends upon proper tuning of the receiver, the color killer circuit may operate to disable the color portions of the receiver even when a color signal is present, if the receiver is not properly tuned to receive the color signal.

It is therefore an object of the present invention to provide an indicator circuit for a color television receiver which indicates when a color signal is being receved.

Another object of the invention is to provide an indicator which indicates that the color receiver is properly tuned to receive a color signal, such that the color reference component is being derived therefrom in the receiver.

A feature of the invention is the provision of a receiver for monochrome and color television signals including a stage for translating chroma signal components received as part of the color signal and a color killer circuit for disabling this stage in the absence of a color reference component, with an indicator coupled to the stage showing when it is operative to thereby show that a color signal is received. The indicator further shows that the receiver is properly tuned so that the color reference component is derived from the color signal in the receiver.

Another feature of the invention is the provision of a color television receiver including a band pass amplifier having an electron device for translating chroma signal components and a color killer circuit for disabling the band pass amplifier, with a neon bulb connected across the load resistor of the electron device to show when the amplifier is operating.

The invention is illustrated in the single figure of the drawing which is a partial block and schematic diagram of a color television receiver.

In practicing the invention a color television receiver is provided which is operative to receive both monochrome and color signals. The receiver includes certain parts which are operative only for color reception including the band pass amplifier for chroma signal components, color reference signal circuits, color demodulator, etc. The receiver includes a color killer circuit which cuts off the band pass amplifier when monochrome signals are received by applying a negative bias to the grid of the amplifier tube. When a color signal is received and the reference burst is derived in the receiver, this burst operates to disable the color killer circuit to remove the negative voltage from the band pass amplifier so that this amplifier conducts and applies the chroma signal components to the color demodulator. The demodulator in turn applies signals to the color tube to reproduce a color image. The band pass amplifier tube is energized through a load resistor across which a substantial voltage drop occurs when the tube is conducting. A neon bulb connected across this load resistor glows when the band pass amplifier is operating. This bulb therefore glows when a color signal is received within the receiver to indicate color reception. The neon bulb also serves as a coarse tuning indicator as it glows only when the receiver is tuned close to the frequency of the received color signal.

Referring now to the drawing, a color television receiver is shown including an antenna 10 which receives signals and applies the same to a tuner 11. The tuner converts the received composite television signal to intermediate frequency, and this signal is amplified in amplifier 12. The intermediate frequency signals are detected in detector system 13 which applies the video signal to video amplifier 14 and the audio signal to audio system 15. The audio system derives the audio signal from the received intercarrier signal and applies it to loudspeaker 16 which reproduces the signal.

Signals from the video amplifier 14 are applied to the three beam color cathode ray tube 20, being applied to the three cathodes 21 thereof. Signals from the video amplifier are also applied to a synchronization system 22, and to chroma amplifier 23. The synchronization system 22 applies synchronizing pulses to the vertical deflection system 25 and the horizontal deflection and high voltage system 26. The vertical and horizontal deflection systems apply signals to the deflection yoke 27 which produces fields for deflecting the cathode ray beams. These systems work in known manner to deflect the beams of the cathode ray tube and provide a high voltage for the tube so that a raster is produced on the screen. Signals from the vertical and horizontal deflection systems are also applied to the convergence system 28. The convergence system 28 applies signals to convergence yoke 29 to converge the three beams of the tube 20 at the screen.

The croma amplifier 23 selects signals in a band around 3.5 megacycles, which contain the chroma components of the received color signal. These are applied to band pass amplifier 30, which also amplifies the chroma components, and from the band pass amplifier to the color demodulator 40. The color signals include a burst applied during the horizontal retrace period which forms a reference for the chroma components. This burst is derived from the output of chroma amplifier 23 by burst gate and amplifier 41. The amplifier 41 applies the burst signal to the color oscillator and automatic frequency control (AFC) system 42 which provides the reference signal for the color demodulator 40. Three separate color outputs are derived from the color demodulator and applied to the three grids 19 of the color tube 20.

Inasmuch as the receiver as described may be used to receive both monochrome and color signals, and certain parts of the receiver have no function for monochrome reception, it is desired to disable these parts during monochrome reception so that they do not pass noise which might produce interference. This is accomplished by a color killer circuit 45 which operates to disable band pass amplifier 30 in the absence of a color signal. The color killer circuit 45 permits the band pass amplifier 30 to operate when a burst is received from the burst gate and amplifier 41.

The color killer circuit 45 includes a triode tube 46 which may be a triode section of a multiple section tube. The cathode of the tube 46 is maintained at a positive potential by the voltage divider including resistors 47 and 48, with capacitor 49 providing bypass. The plate of the tube 46 is connected to a positive potential through resistors 50 and 51. The grid of the tube 46 is also biased to a positive value by the connection to a positive potential through resistors 52, 53 and 54, with resistor 53 providing adjustment of the grid bias.

Pulses are applied to the plate of tube 46 from horizontal deflection system 26, through the filter including resistor 55, and capacitors 56 and 57. The triode tube 46 functions as a rectifier to produce a negative potential at the plate in response to the horizontal pulses. This potential is mixed with the positive supply potential by resistors 50 and 51 to provide a resultant negative potential on line 58. The burst amplifier 41 is coupled to the grid of tube 46 through rectifier 60 and resistors 61 and 62, which develop a negative potential across capacitor 63. This negative potential across capacitor 63 is applied to the grid of triode 46 to cutoff the triode. Accordingly, when the receiver is operating to receive a monochrome signal, the horizontal pulses applied to tube 46 produce a negative voltage on conductor 58. However, when a color signal is received the burst signal is rectified and applied as a negative voltage to the grid of tube 46 and cuts off this tube. Accordingly the tube 46 cannot then act as a rectifier, and a postive potential is applied through resistor 50 to line 58.

Considering now the bandpass amplifier 30, a signal is applied from chroma amplifier 32 through the tuned input coupling circuit 31 to the tetrode tube 33. A portion of the signal from the input circuit 31 is derived across potentiometer 32 and applied to the control grid of tube 33. This signal is amplified in tetrode tube 33 and applied to the tuned output circuit 34. The tuned output circuit is coupled to color demodulator 40 to apply the chroma components thereto. Conductor 58 from the color killer circuit 45 is connected to potentiometer 32 to apply a bias potential to the control grid of tube 33. When a negative potential is applied on line 58 during monochrome reception, this negative potential operates to cut off tube 33. However in the presence of a color signal, the potential on line 58 is positive and provides a proper bias to render tube 33 conducting so that the chroma signal is amplified thereby.

The plate of tube 33 of band pass amplifier 30 is connected to the positive potential through output circuit 34 and load resistor 35. When the tube 33 is conducting, a voltage drop occurs across load resistor 35, and when tube 33 is cut off by the color killer circuit there is no voltage across this resistor. This characteristic is utilized to provide an indication of the reception of a color signal. This indication is provided by neon bulb 36 connected in series with resistor 37 across load resistor 35. When band pass amplifier 30 is conducting so that tube 33 draws current through resistor 35, the voltage across resistor 35 is applied to neon bulb 36 and causes this bulb to conduct. The user of the receiver can therefore tell that a color signal is being received.

The indicator 36 also serves as a coarse tuning indicator for color signals. A burst will not appear at the output of burst gate and amplifier 41 unless the receiver is tuned reasonably close to the desired signal. Therefore if the user knows that a color signal is being broadcast and the indicator does not show that a color signal is being received, he can adjust the fine tuning and when the receiver is tuned so that the burst is derived in the receiver the indicator will show this. The user can then further adjust the fine tuning to correct the same by observing the appearance of the reproduced color image.

We claim:

1. A television receiver including in combination, a color producing cathode ray tube, means for applying signals to said tube to provide monochrome reproduction in response to received monochrome signals and to provide color reproduction in response to received color signals which include chroma signal components and a color reference component, said means including selecting means for deriving the color reference component from received color signals, a translating stage for passing chroma signal components of received color signals for controlling the colors of the reproduced image, means coupled to said selecting means and to said translating stage for disabling the latter in the absence of the color reference component, and indicator means coupled to said translating stage and operative when said translating stage is operative to indicate the reception of a color signal.

2. In a television receiver including a color producing cathode ray tube and means for applying signals to the same to provide monochrome reproduction in response to received monochrome signals and to provide color reproduction in response to received color signals which include chroma signal components and a color reference component, the combination including, selecting means for deriving the color reference component from received color signals, a translating stage for passing chroma signal components of received color signals for controlling the colors of the reproduced image, control means coupled to said selecting means and to said translating stage for disabling the latter in the absence of the color reference component, said control means rendering said translating stage operative in response to the color reference component, and indicator means coupled to said translating stage and operative when said translating stage is operative to indicate the reception of a color signal.

3. In a television receiver including a color image producing cathode ray tube and means for applying signals thereto to provide monochrome image reproduction in response to received monochrome signals and to provide color image reproduction in response to received color signals which include chroma signal components and a color reference component, the combination including, selecting means for deriving the color reference component from the received color signal, control means coupled to said selecting means for developing a control potential in response to the color reference component, a translating stage for passing chroma signal components of received color signals for controlling the colors of the reproduced image, indicator means to indicate the reception of a color signal to a user of the receiver, and circuit means intercoupling said control means, said translating stage and said indicator means so that said translating stage and said indicator means are both operative in response to the control potential of said control means and so that said translating stage and said indicator means are both inoperative in the absence of the control potential.

4. In a television receiver including a color producing cathode ray tube and means for applying signals to the same to provide monochrome reproduction in response to received monochrome signals and to provide color reproduction in response to received color signals which include chroma signal components and a color reference component, the combination including, selecting means for deriving the color reference component from received color signals, a band pass amplifier for passing chroma signal components of received color signals for controlling the colors of the reproduced image, said band pass amplifier including an electron device adapted to be cut off by a control potential and impedance means through which current flows when said electron device conducts, control means coupled to said selecting means for producing a control potential in the absence of the color reference component, means connecting said control means to said electron device for cutting off said electron device by said control potential, said control means being operative in response to the color reference component to cut off said control potential so that said electron device is conductive, and indicator means coupled to said impedance means and operative when said electron device is operative to indicate the reception of a color signal.

5. In a television receiver including a color producing cathode ray tube and means for applying signals to the same to provide monochrome reproduction in response to received monochrome signals and to provide color reproduction in response to received color signals which include chroma signal components and a color reference component, the combination including, selecting means for deriving the color reference component from received color signals, a band pass amplifier for passing chroma signal components of received color signals for controlling the colors of the reproduced image, said band pass amplifier including an electron device having a control electrode and an output electrode and connecting said output electrode to potential supply means, control means coupled to said selecting means for producing a negative control potential in the absence of the color reference component, said control means being operative in response to said color reference component to produce a positive control potential, means connecting said control means to said electron device for cutting off the same by said negative control potential and for rendering said electron device conductive by the positive control potential, and indicator means coupled to said impedance means and operative when said electron device is operative to indicate the reception of a color signal.

6. In a television receiver including a color producing cathode ray tube, means for deflecting the beam of said tube, and means for applying signals to the tube to provide monochrome reproduction in response to received monochrome signals and to provide color reproduction in response to received color signals which include chroma signal components and a color reference component, the combination including, selecting means coupled to the deflecting means for deriving the color reference component from received color signals, a translating stage for passing chroma signal components of received color signals for controlling the colors of the reproduced image, said translating stage being responsive to a control potential for rendering the same non-conducting, control means coupled to the deflecting means for producing a control potential from the signal derived therefrom, said control means being coupled to said selecting means and operative to cut off said control potential in response to the color reference component, means connecting said control means to said translating stage for applying said control potential thereto for disabling said stage in the absence of the color reference component and rendering said stage conductive when the color reference component is received, and indicator means coupled to said translating stage and operative when said translating stage is operative to indicate the reception of a color signal.

7. In a television receiver including a color producing cathode ray tube, means for deflecting the beam of the tube, and means for applying signals to the tube to provide monochrome reproduction in response to received monochrome signals and to provide color reproduction in response to received color signals which include chroma signal components and a color reference component, the combination including, selecting means coupled to the deflecting means for deriving the color reference component from received color signals, a band pass amplifier for amplifying chroma signal components of received color signals for controlling the colors of the reproduced image, said band pass amplifier including an electron device and resistor means connected thereto through which current flows when said electron device conducts, control means coupled to the deflecting means for producing a negative control potential from the signal derived therefrom, said control means being coupled to said selecting means and operative in response to the color reference component to produce a positive control potential, means connection said control means to said electron device and applying said negative control potential thereto for disabling said amplifier in the absence of the color reference component and applying said positive potential to said electron device for rendering said amplifier operative when the color reference component is received, and neon bulb indicator means connected across said resistor means and operative in response to the voltage thereacross when said amplifier is operative to indicate the reception of a color signal.

8. A television receiver including in combination a color image producing cathode ray tube, a receiver circuit for applying signals to said cathode ray tube to provide monochrome image reproduction in response to received monochrome signals and to provide color image reproduction in response to received color signals which include chroma signal components and a color reference component, said receiver circuit including selecting means for deriving the color reference component from the received color signals, color killer circuit means coupled to said selecting means and responsive to the presence of the color reference component to produce a control potential, said receiver circuit further including a signal translation network including an electron control device responsive to a control potential to switch between a first receiver condition for color image reproduction and a second receiver condition for monochrome image reproduction, a light bulb indicator for indicating color signal reception and translation in said receiver, and said receiver circuit further including circuit means coupling said electron control device and said lightbulb indicator to said color killer circuit means so that the control potential therefrom both switches said electron control device to the first condition and energizes said lightbulb indicator and so that absence of said control potential both switches said electron control device to the second condition and de-energizes said lightbulb indicator.

References Cited by the Examiner

UNITED STATES PATENTS

| | | | |
|---|---|---|---|
| 3,129,283 | 4/1964 | Tarantur | 178 to 5.4 |
| 3,206,550 | 9/1965 | Fink | 325 to 364 |

DAVID G. REDINBAUGH, *Primary Examiner*.

J. A. O'BRIEN, *Assistant Examiner*